United States Patent
Maev et al.

(10) Patent No.: US 11,529,681 B2
(45) Date of Patent: Dec. 20, 2022

(54) 3D PRINTING METHOD OF FORMING A BULK SOLID STRUCTURE ELEMENT BY COLD SPRAY

(71) Applicant: Tessonics, Inc., Windsor (CA)

(72) Inventors: Roman Gr. Maev, Windsor (CA); Volf Leshchynsky, Windsor (CA); Emil Strumban, West Bloomfield, MI (US); Damir Ziganshin, Windsor (CA); Raymond Belenkov, Windsor (CA); Dmitry Dzhurinskiy, Windsor (CA); Dmitriy Jurievich Gavrilov, Windsor (CA)

(73) Assignee: Tessonics, Inc., Windsor (CA)

( * ) Notice: Subject to any disclaimer, the term of this patent is extended or adjusted under 35 U.S.C. 154(b) by 91 days.

(21) Appl. No.: 15/676,115

(22) Filed: Aug. 14, 2017

(65) Prior Publication Data
US 2018/0050391 A1 Feb. 22, 2018

Related U.S. Application Data

(60) Provisional application No. 62/375,685, filed on Aug. 16, 2016.

(51) Int. Cl.
*B22F 3/02* (2006.01)
*C23C 24/00* (2006.01)
(Continued)

(52) U.S. Cl.
CPC ............ *B22F 3/02* (2013.01); *B33Y 10/00* (2014.12); *B33Y 50/00* (2014.12); *C23C 24/00* (2013.01); *C23C 24/04* (2013.01)

(58) Field of Classification Search
CPC ........... B33Y 10/00; B33Y 50/00; B22F 3/02; C23C 24/00; C23C 24/04
See application file for complete search history.

(56) References Cited

U.S. PATENT DOCUMENTS 8,132,740 B2    3/2012  Maev et al.
2002/0104973 A1*  8/2002  Kerekes ............. B33Y 50/02
                                                           250/559.2
(Continued)

FOREIGN PATENT DOCUMENTS

CN    104985813 A    10/2015
WO    2015157816 A1  10/2015
(Continued)

OTHER PUBLICATIONS

International Search Report and Written Opinion for related WO Application Serial No. PCT/IB2017/054969, dated Nov. 30, 2017.
(Continued)

*Primary Examiner* — Keith Walker
*Assistant Examiner* — Adil A. Siddiqui
(74) *Attorney, Agent, or Firm* — Carlson, Gaskey & Olds, P.C.

(57) ABSTRACT

A method of forming a three dimensional object using a low pressure cold spray process for is disclosed. Powdered material is delivered at a temperature below the melting point of the powdered material. A nozzle of a cold spray gun is aligned at an angle $\theta_1$ to the substrate. The powdered material is delivered at a supersonic speed to the substrate causing the powdered material to adhere to the substrate for forming a first layer of material. An amount of optical distortion caused by the first layer of material adhered to the substrate is determined relative to the substrate and the nozzle is reoriented to an angle $\theta_2$ being offset from an axis defined by the first layer of material. A second layer of material is deposited onto the first layer of material with the nozzle being oriented at the angle $\theta_2$ to the first layer of material.

16 Claims, 7 Drawing Sheets

(51) Int. Cl.
*B33Y 50/00* (2015.01)
*B33Y 10/00* (2015.01)
*C23C 24/04* (2006.01)

(56) References Cited

U.S. PATENT DOCUMENTS

| | | |
|---|---|---|
| 2014/0277669 A1 | 9/2014 | Nardi et al. |
| 2015/0219444 A1* | 8/2015 | Bamberg ............. G01B 11/162 |
| | | 419/55 |
| 2016/0067928 A1* | 3/2016 | Mark .................... B29C 64/209 |
| | | 264/401 |
| 2018/0169686 A1* | 6/2018 | Camilleri ............ B05B 13/0221 |

FOREIGN PATENT DOCUMENTS

| | | | |
|---|---|---|---|
| WO | WO-2015157816 A1 * | 10/2015 | ............... B05B 7/14 |
| WO | 2016197208 A1 | 12/2016 | |

OTHER PUBLICATIONS

J. Pattison et al., "Cold gas dynamic manufacturing: A non-thermal approach to freeform fabrication," International Journal of Machine Tools and Manufacture, 2007, vol. 47, pp. 627-634.

* cited by examiner

3D PRINTING METHOD OF FORMING A BULK SOLID STRUCTURE ELEMENT BY COLD SPRAY

PRIOR APPLICATIONS

The present application claims priority to U.S. Provisional Patent Application No. 62/375,685 filed Aug. 16, 2016, the contents of which are incorporated herein by reference.

TECHNICAL FIELD

The present invention is directed to a 3D printing method by low pressure cold spray (LPCS) that may be used for producing bulk solid structural elements.

BACKGROUND

Many characteristics of a LPCS such as the ability to form dense deposits with extremely low oxygen content, free of residual tensile stresses provide for the creation of unique metal or metal-ceramic coatings. The portability of LPCS systems and relatively low cost makes the technology attractive for a number of industries, including automotive, aerospace, energy, and military. One such example of a spray gun used to perform LPCS is disclosed in U.S. Pat. No. 8,132,740 to the assignee of the present application, the contents of which are incorporated herein by reference.

However, the application of the LPCS technology for production of 3D components has not been thought technically feasible or technically viable. The main drawbacks of LPCS application for additive manufacturing are the difficulties of controlling an additive process for bulk solid structured elements (thin walls, columns, etc.). The asymmetrical profile of a single pass deposited by LPCS and lack of the precise control of the powder material buildup process during the fabrication by spraying of a bulk component structured element results in the inability of LPCS technique to obtain desired structural geometry. The precise control of the powder buildup process requires the ability to adjust the direction of spraying over a relatively short time interval so that the buildup process reproduces the desired 3D shape of the component. The ability to adjust the direction of cold spraying over a relatively short period has proven elusive. Thus, prior to the present invention there has been a long felt need for improvement in LPCS process to enable this unique process to be used for the fabrication of 3D structures.

SUMMARY

The new 3D printing method provided in the invention is based on using 4 lasers conjugated with the LPCS nozzle and 4 digital cameras for controlling the shape of the subsequent spray passes. The 4 lasers create on the substrate 4 light strips located around the LPCS-jet footprint. The real-time information from 4 digital cameras perform image analysis of the light strips shapes in real time during spraying and execute specific control functions normally performed by operators. Each frame from the 4 cameras is digitally processed in order to extract the contours of the laser stripes. The surface profile extracted from these images is then compared to those of the reference surface profiles, which are defined as the operational "standard" during spraying of each consecutive pass. Deviations from the reference profiles that exceed a defined threshold are output to the control system to take corrective action to adjust the spraying process by changing the spraying parameters. The applications of the disclosed approach include dynamic spray direction angle control, deposited pass thickness control, deposited pass shape control; powder feed rate control, nozzle position control, etc. with control signals determined from a two-dimensional camera image.

BRIEF DESCRIPTION OF THE DRAWINGS

Other advantages of the present invention will be readily appreciated as the same becomes better understood by reference to the following detailed description when considered in connection with the accompanying drawings, wherein.

DETAILED DESCRIPTION

A low pressure cold spraying (LPCS) method for 3D printing process includes deposition of powder material onto a substrate using a nozzle controllably inclined relative to a vertical axis of a deposition surface to achieve the buildup formation of various elements of bulk structural elements such as straight, cylindrical and curved thin walls, columns, etc.

Figure 1A:
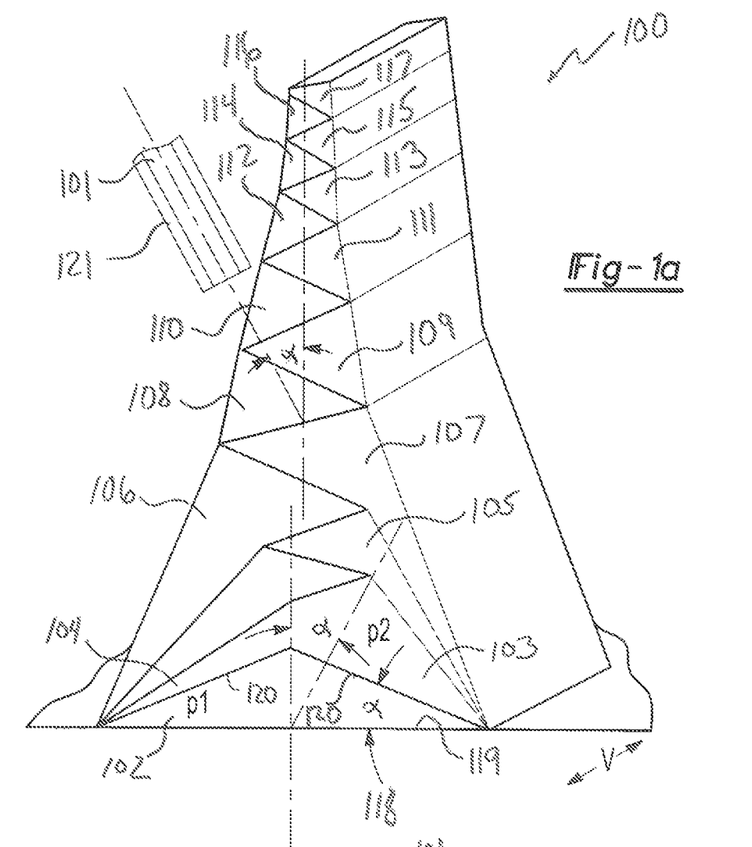
FIG. 1a shows schematics of a low pressure cold spray (LPCS) method for additive manufacturing of straight thin walls.
Figure 1B:
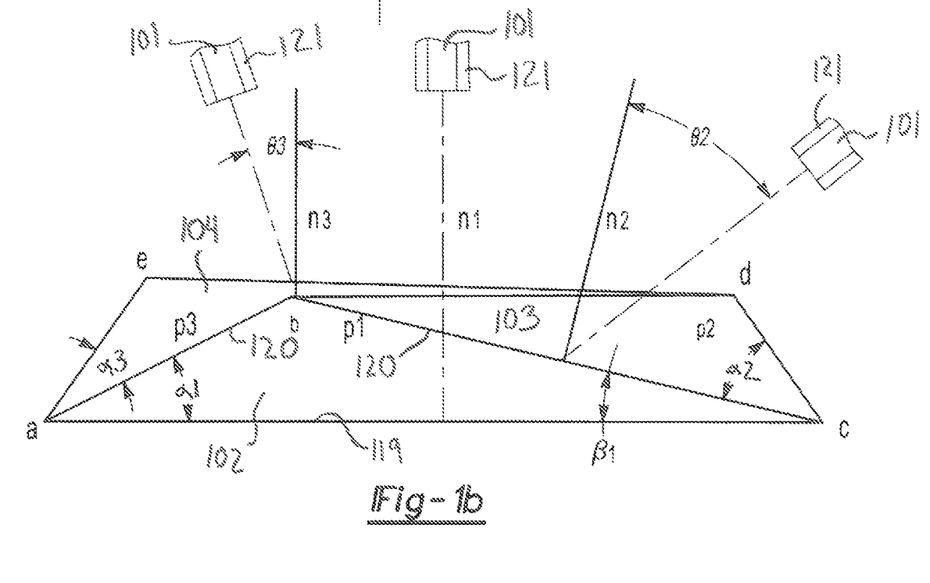
FIG. 1b shows schematics of a LPCS strategy for additive manufacturing of straight thin walls according to one embodiment of the invention.
Figure 1C:
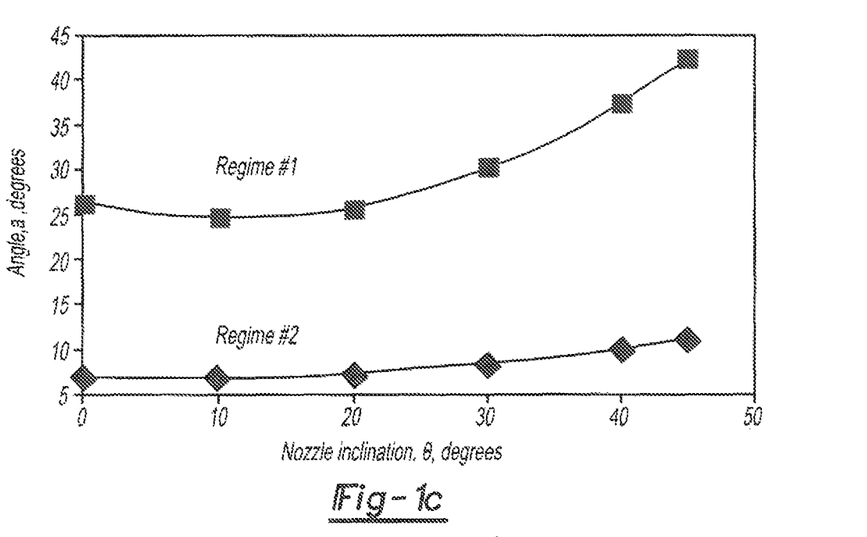
FIG. 1c shows experimental results to define the deposited pass geometry dependence on inclination of nozzle relatively normal to surface to be deposited.
Figure 2:
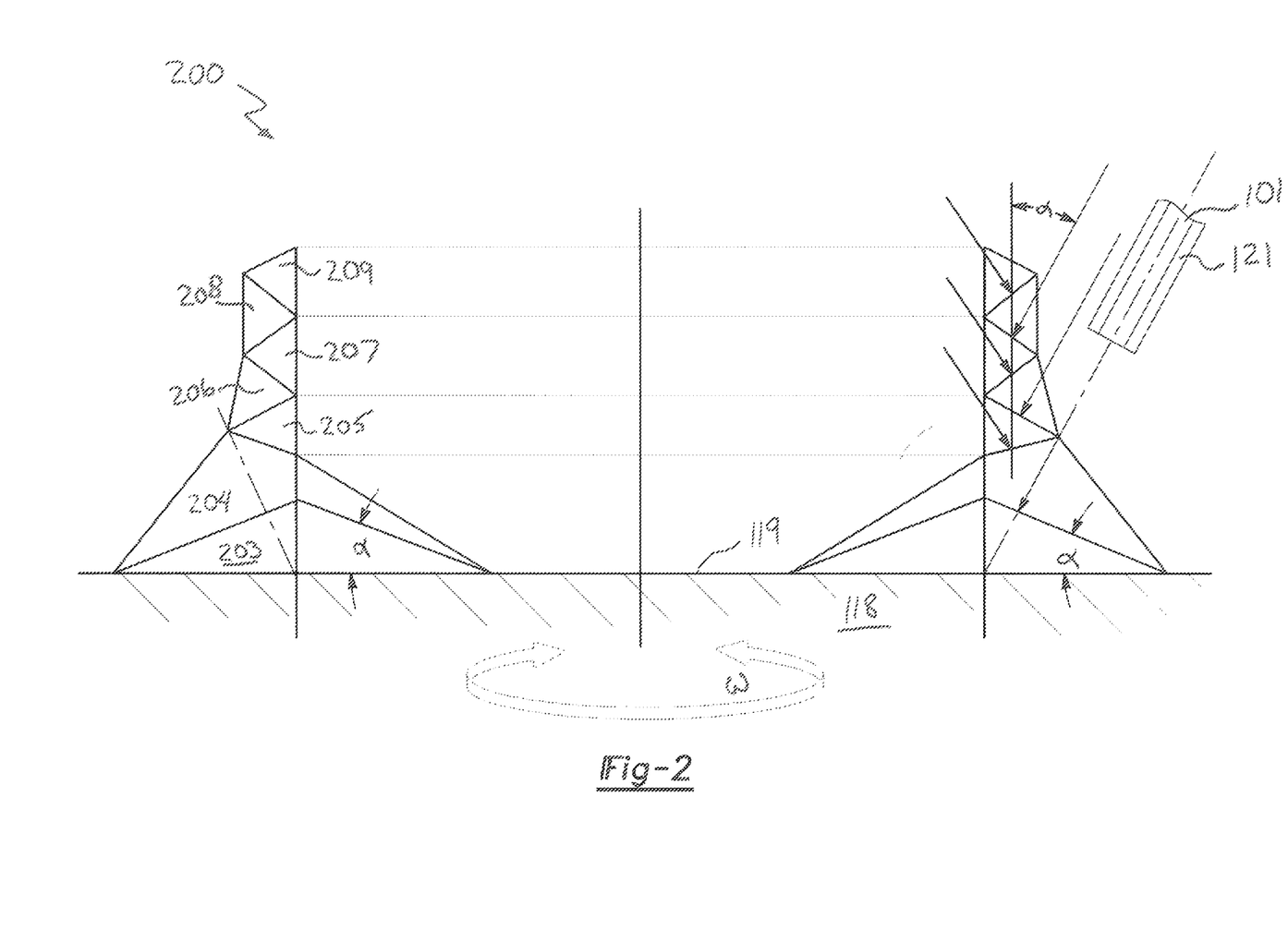
FIG. 2 shows schematics of a LPCS strategy for additive manufacturing of cylindrical walls.
Figure 3:
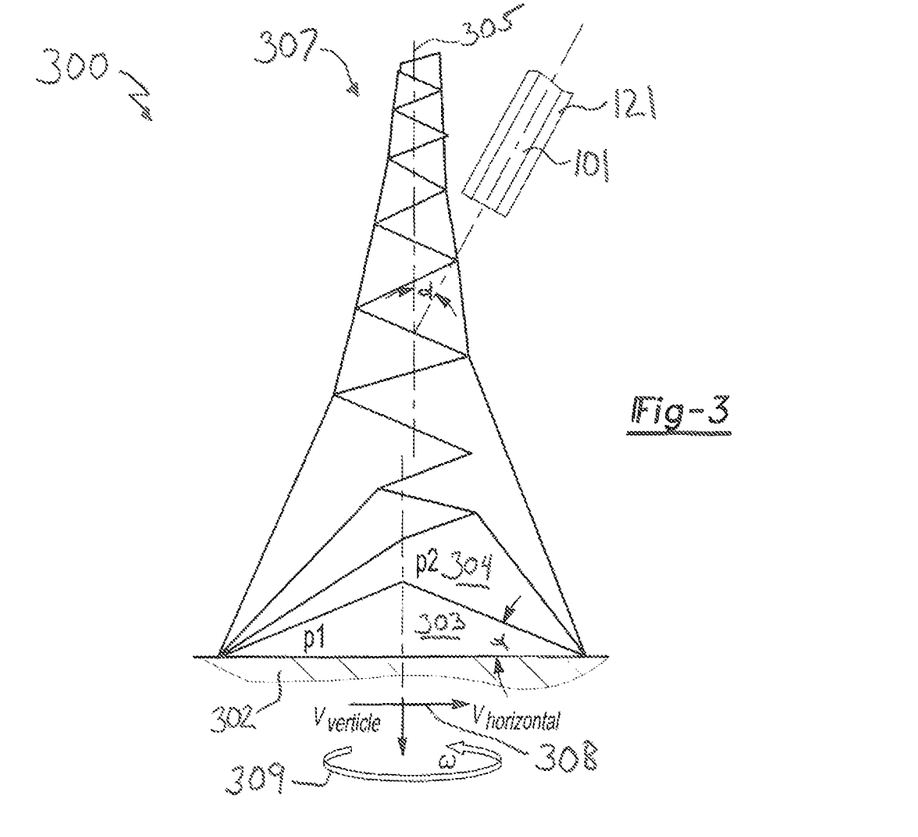
FIG. 3 shows schematics of a LPCS strategy for additive manufacturing of cylindrical columns.

Example embodiments of present invention and their advantage are best understood by referring to FIG. 1 through 8. FIGS. 1-3 show the deposition schemes of the straight wall (FIG. 1a), cylindrical or curved thin wall (FIG. 2) and cylindrical column (FIG. 3).

LPCS deposition schematics are generally shown at 100 of FIG. 1. A nozzle 101 of a spray gun (not shown) used to perform LPCS spraying provides a laden jet of powder material and gas at supersonic speeds. A gas cooling element 121 provides effective gas cooling of both divergent portions of the nozzle 101 and a substrate 119 onto which powder is deposited.

A spraying orientation of the nozzle 101 for each pass to be deposited is defined by the shape of each previously deposited pass. An inclination angle θ of the nozzle is relatively normal to a substrate surface 119 onto which a first layer 102 of powdered material is deposited. A stand-off-distance and nozzle coordinates are also determined based upon the inclination angle θ.

During high pressure cold spraying of the first layer 102, the deposition is performed at an initial nozzle 101 position along a surface axis $n_1$ and results in a deposit shaped as a substantially isosceles shaped triangular prism with an oblique angle α between the substrate surface or base 119 onto which the powdered material is deposited and opposing sides 120 of the isosceles shaped triangular prism.

To build up a straight wall element, sequential passes of the nozzle 101 are made for depositing a second layer 103 over the first layer 102 a second pass of the nozzle 101 is made over the first layer 102. In one embodiment, the nozzle 101 is oriented perpendicular to the one of the opposing sides 120 of the prism 102. Alternatively, the nozzle is oriented at an angle α to the first layer axis $n_2$ of the opposing sides 120. When oriented to the angle α, the nozzle 101 deposits the second layer of powdered material 103 over the first layer of powdered material 102 by making a second pass.

To continue forming a straight wall, a similar nozzle positioning procedure is to be realised for third pass to deposit a third layer 104 of material over the second layer 103 of material. The nozzle 101 is oriented at an angle $\theta_3$ to second layer axis $n_3$ for depositing the third layer 104 during the third pass. The process is serially repeated to deposit layers 104-117 as represented in FIG. 1a. It is within the scope of this invention to deposit walls of different shapes by positioning the nozzle in a way that consecutive passes are shifted relative to each other. The LPCS arrangement resulting in changing the wall shape and shifting the wall axes as each layer 102-117 is deposited is shown in the first embodiment in FIG. 1a. FIG. 1b illustrates one 3D printing method providing passes $p_1$, $p_2$ and $p_3$ by LPCS for the deposition of first layer 102, second layer 103 and third layer 104 respectively. The deposition of the first layer during first pass $p_1$ of the nozzle 101 is performed at initial nozzle position #1 along the axis $n_1$ that is normal to the substrate 118 (θ=0). The first layer 102 is shaped as a scalene triangular prism with an oblique angles $\alpha_1$ and $\beta_1$ between the prism's base ac and sides ab and bc respectively.

To deposit the second layer 103, a second pass $p_2$ is performed providing a desired geometry bdc, the nozzle 101 is oriented to be inclined relative to the normal axis $n_2$ of side 120 (bc) with an angle $\theta_2$ identified as position #2. To deposit the third layer 104, a third pass $p_3$ is performed providing a desired geometry aed as identified by nozzle position #3 inclined to normal axis $n_3$ of side 120 (bd) at an angle $\theta_3$. A desired geometry of the isosceles prism walls ae and dc ($\alpha_1+\alpha_3=\beta_1+\alpha_2$) is obtained due to such LPCS deposition strategy.

FIG. 1c illustrates an example of experimental data to define the angle α dependence on nozzle inclination angle $\theta_2$ for one pass at a fixed set of LPCS parameters (gas pressure and temperature, powder material grade, particle size and powder feeding rate, stand-of-distance and nozzle transverse speed) during deposition of one pass on the flat substrate surface. Regime #1 identifies deposition of commercial atomised 525 mesh Al powder with the nozzle traverse speed of 33 mm/s whilst regime #2 identifies LPCS of same Al powder with the nozzle traverse speed of 10 mm/s. The following LPCS parameters were fixed: air pressure at 9 bar, air temperature at 400° C., stand-off-distance at 15 mm, powder feed rate at 0.3 g/s. The general representation of obtained results may be presented with equation:

$$\alpha = A\theta^2 + B\theta + C,$$

Where A, B, C are the coefficients of polynomial approximation. The equation provides for calculating inclination angle θ of the nozzle 101 needed to obtain the targeted angle α.

Each sequential pass is deposited on the perspective planes ac, bc and ab of the first triangular prismatic pass best shown in FIG. 1b. Angles $\theta_2$ and $\theta_3$ are calculated in accordance to the equations shown below in order to obtain the desirable angles eac=dca ($\alpha_1+\alpha_3=\beta_1+\alpha_2$) of the prism obtained by deposition of three sequential passes. Therefore, it is possible to define the angle $\alpha_2$ of the second layer 103 deposited from the second pass $p_2$ based on targeted value of the angle dca: $\alpha_2=dca-\beta_1$. The quadratic equation $\alpha_2=A\theta^2+B\theta+C$ then can be solved relative to determine $\theta_2$:

$$\theta_2 = \frac{-B \pm \sqrt{B^2 - 4(C-\alpha_2)A}}{2A}$$

In a similar manner, the angle $\theta_3$ is calculated by the similar procedure. From a determination of $\alpha_3$: $\alpha_3$=eac−$\alpha_1$, $\theta_3$ is determined by:

$$\theta_3 = \frac{-B \pm \sqrt{B^2 - 4(C-\alpha_3)A}}{2A}$$

The approximation of function α=f(θ) is made on the base of experimental data obtained with low pressure cold spray gun installed on the Cartesian robot. It provides stable deposition technology parameters (nozzle traverse speed, standoff distance). The LPCS gun and nozzle 101 was installed with a different inclination angle θ in relation to an axis that was normal to substrate surface. Experiments were made with θ having an angle of 10, 20, 30, 40 and 45o with two traverse speeds (10 mm/s and 33 mm/s). The experimental function α=f(θ) was approximated with polynomial quadratic approximation (for example) y=0.015×2−0.3241x+26.49 with simulation veracity of $R^2$=0.9989. So, general representation of the function α=f(θ) is α=$A\theta^2+B\theta+C$, where A,B,C are the coefficients of polynomial approximation. The similar experiments need to be made for various LPCS parameters and spraying materials.

FIG. 2 illustrates a further embodiment of deposition arrangement generally at 200 for forming a cylindrical thin wall 213 upon a substrate 202. A nozzle 201 positions the deposition passes to form layers 204 through 209. Each pass is represented by arrows 211, and nozzle inclination angle is being calculated by the method described above. In this embodiment, the cylindrically-shaped wall 113, the substrate 202 is rotated relative to the nozzle 201.

FIG. 3 illustrates a still further embodiment of deposition arrangement generally at 300 for depositing a cylindrical column 307 upon a substrate 302. The orientation and location of the nozzle 101 is coordinated with continuous movement of the substrate 302 relative to the nozzle 101 in the vertical as shown by arrows 308 and in the pivotal direction as shown by arrows 309. The first layer 303 is deposited by a first pass $P_1$ of the nozzle 301 while oriented perpendicular to the substrate 302, whilst the second layer 304 is deposited during a second pass $P_2$ by the nozzle 301 that is inclined at an angle α to vertical axis 305. Additional layers are deposited in a manner as set forth in the prior embodiments above.

Figure 4A:
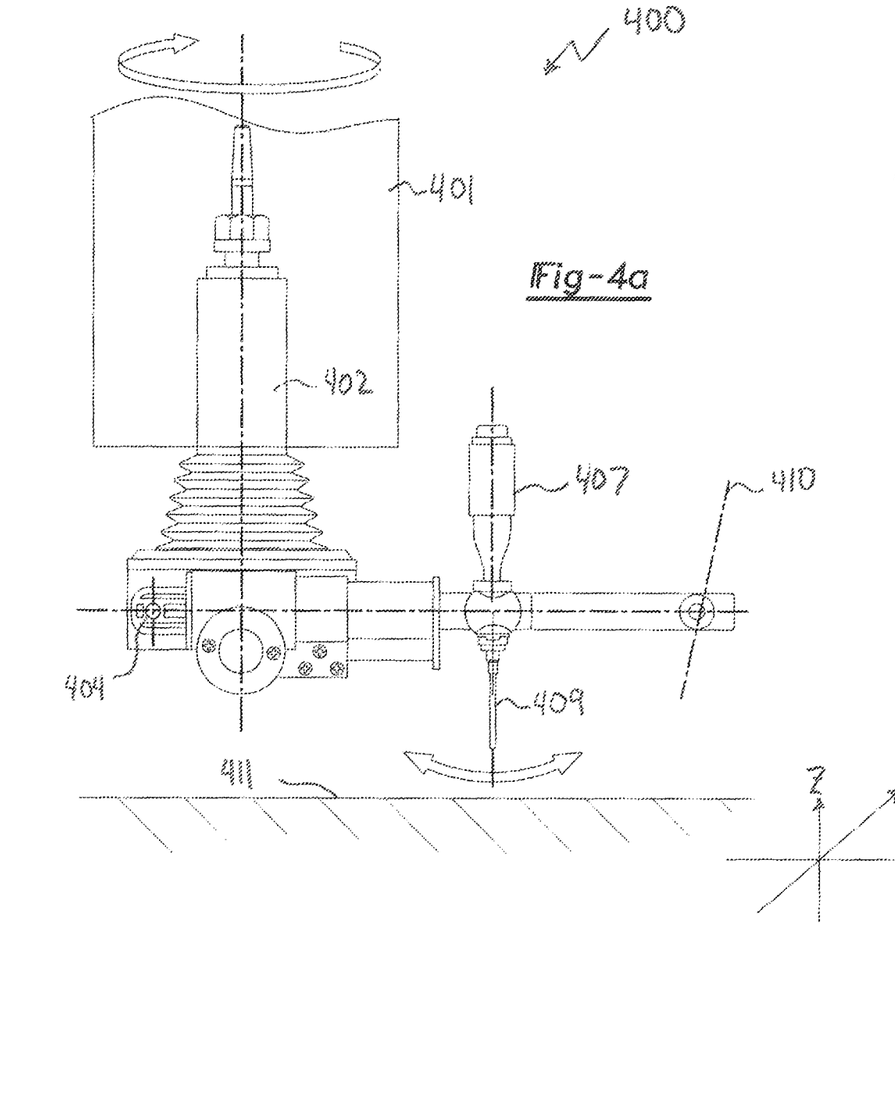
FIGS. 4a and 4b shows a schematic diagram of a the LPCS-based additive manufacturing system installed at a milling centre according to one embodiment of the invention.
Figure 4B:
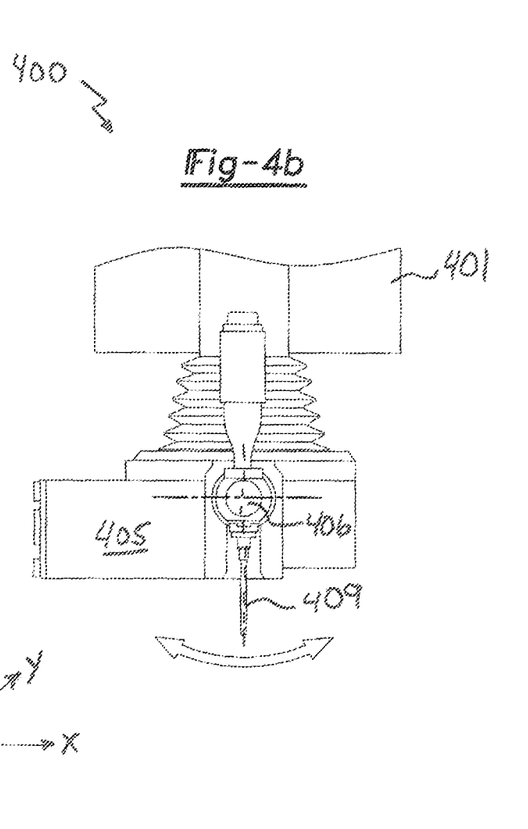

FIGS. 4a and 4b shows a schematic view of an LPCS 3D printing system 400 for manufacturing or repairing parts (molds, dies, etc.). The system 400 is installed on a CAD milling machine 401. A CAD controlled LPCS spray gun 407 movement system 403 is affixed to a milling machine spindle 402, and provides for a linear shift of the spray gun 407 by using a stage 404 and gear box 405. The stage 404 is equipped with a rotation head 406 onto which the LPCS spray gun 407 is installed. Therefore, the spraying direction of a nozzle 409 of the spray gun 407 may be adjusted by changing the direction of the inclination of the axis 410.

The system 400 provides for the movement and orientation of the LCDS spay gun 407 and nozzle 409 necessary for 3D printing of parts positioned on a table 411 of the CAD milling machine 401 using LCDS processes. Additionally, the modification of the spraying system 400 with a machining tool (not shown) provides for the implementation of CAD based subtractive machining operations.

Figure 5:
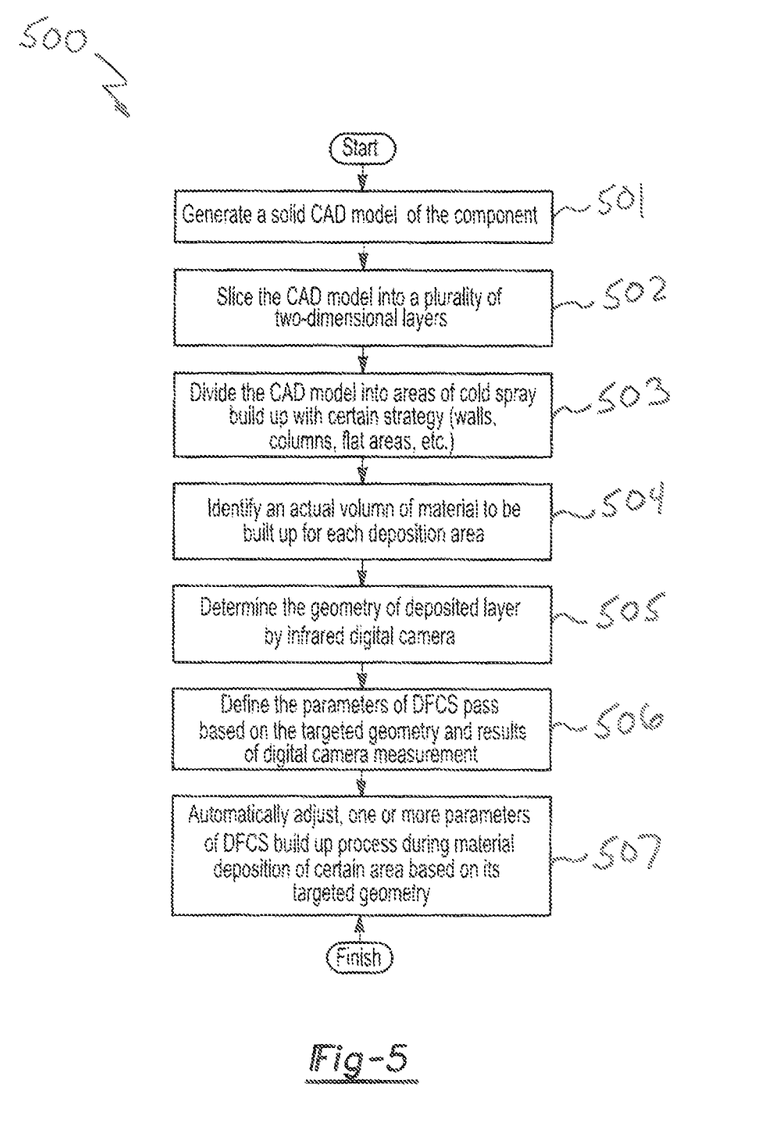
FIG. 5 shows a flowchart illustrating an example method of controlling the operational spraying parameters of the LPCS cold spray-based deposition processes according to one embodiment of the invention.

FIG. 5 shows a flow chart 500 illustrating an exemplary process of 3D printing system operations. After the process has been initiated, step 501 is performed during which a sold CAD model of the component to be formed is generated. A plurality of two dimensional slices of solid CAD model is created in step 502. The CAD model is then divided into areas of cold spray of buildup of walls, columns, and flat areas in step 503. Step 504 is the determination of an actual volume of material required to build up each deposition area. Step 505 includes the determination of the geometry of deposition using a camera, such as, for example, an infrared digital camera. The parameters of DFCS pass are defined based upon the targeted geometry and results of the digital camera measurement during step 506. Step 507 includes automatically adjusting one or more parameters of DFCS build up process during material deposition based upon targeted geometry of the 3D printed component.

Embodiments of the invention provide a number of technical advantages such as:

Use of a portable LPCS gun in existing machining (milling) centers; an LPCS gun nozzle extension has a coaxially positioned tubing member enabling local cooling of the buildup area of the formed 3D structure to avoid internal stresses during the buildup process. A Buildup of the thin wall elements of different shapes Combination of additive manufacturing with intermediate machining (subtractive manufacturing) procedures to achieve the required accuracy of the built up areas;

The digital camera(s)-based monitoring the geometry of the consecutive passes build up process, which allows effectively control the process of LPCS deposition by changing the LPCS parameters such as angle of spraying, position of the nozzle, and nozzle stand-off-distance;

A closed-loop control system based on light strip image processing for controlling the size and shape of the deposited consecutive passes improves the geometrical accuracy of fabricated bulk structural elements and simultaneously provides the desired dense microstructure.

Figure 6:
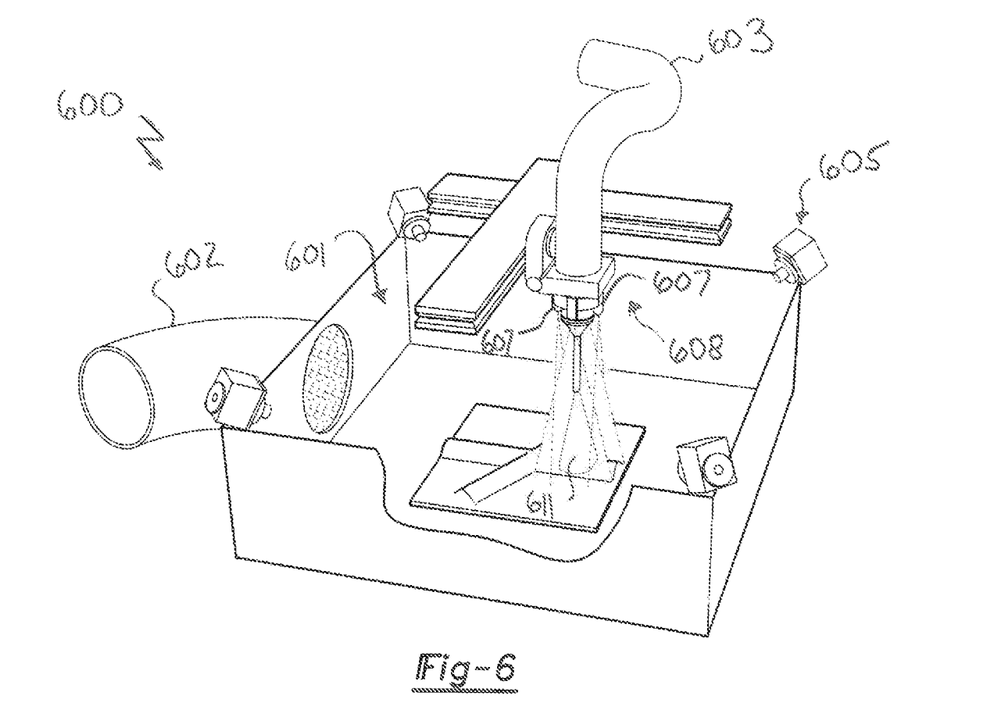
FIG. 6 shows a LPCS system of the present invention.
Figure 7A:
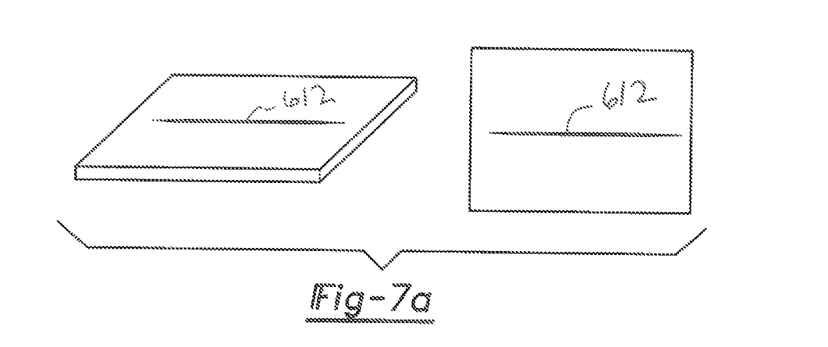
FIGS. 7a and 7b show laser projected profile images.
Figure 7B:
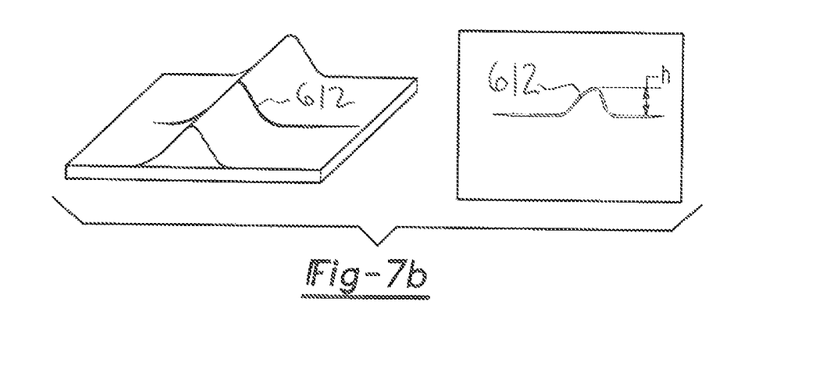
Figure 8A:
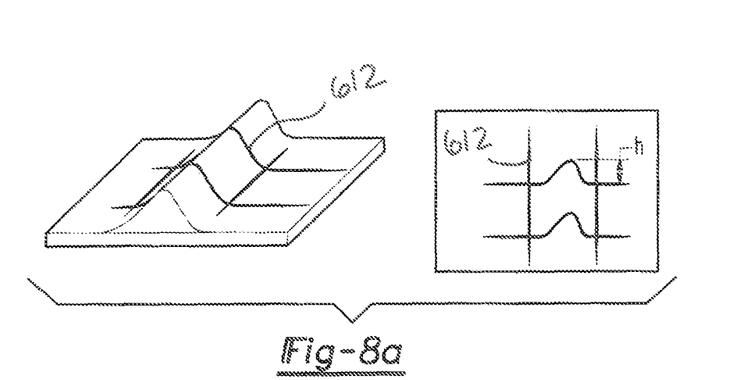
FIGS. 8a and 8b show examples of structured light patterns in case of four laser lines. (a)—lines aligned with the profile created; (b)—lines misaligned.
Figure 8B:
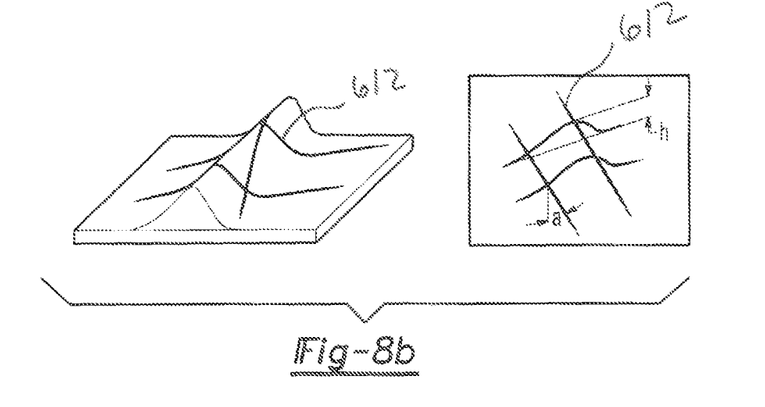

A closed-loop control system based on image processing is generally shown at 600 of FIG. 6. A spray chamber 601 provides an environmental enclosure for the LPCS assembly. The chamber 601 prevents metal spray from dispersing while reducing noise translation and maintaining a clean process enclosure. A combination nozzle and nozzle articulator comprises a spray deposition system 608. A feed line 603 provides powdered material to the spray deposition system 608 in a known manner. In addition, an exhaust line 602 provides for desired pressure inside the chamber 601 and for the recirculation of unused powder 611. The system 608 articulates and shifts the nozzle (as shown in FIGS. 1-3. A laser projection assembly 607 is affixed to the spray depositions system 608 for projecting a laser profile image as shown in FIGS. 7 and 8. The laser projection assembly 607 may include one or more than lasers in combination for projecting profile images 612 (FIGS. 7 and 8) onto the powder material deposition layers.

A video monitoring system 605 includes a plurality of cameras 610 for generating photographs in real time of the profile image projected by the laser projection assembly 607. A computer receives digital images from the cameras 610 and recognizes the parameters of the deposited material by analyzing the distortion in the laser profile images. The distortion is representative of the shape of each layer of deposited powder material 611. Based upon the amount of distortion, the computer determines the configuration of the powder layer adjusts the LPCS deposition parameters and forwards these adjustments to the spray depositions system 608.

The pattern 612 projected by the laser projection system 607 is not distorted to a side observer (camera 610) in case if the projection surface is flat as shown in FIG. 7a. After deposition, the surface has specific profile as shown in FIG. 7b, the side observer 610 detects distortions to the pattern generated by the laser projection system 607. The shape and parameters of the distortion are directly related to the height and shape of the surface profile by simple geometric expressions, which are used in order to extract the real parameters and configuration of the profile.

The nozzle articulating system is capable of motion in arbitrary directions depending on the parameters of profile to be deposited. This fact highlights the desirability of applying a more complicated profile recognition strategy. Among these could be rotationally invariant patterns (circles) and networks of straight lines. Application of such patterns assures the visibility of most of lines and their projection onto the profile being created as shown in FIGS. 8a and 8b.

The invention has been described in an illustrative manner, and it is to be understood that the terminology has been used as intended to be in the nature of words of description rather than of limitation. Obviously, many modifications and variations of the present invention are possible in light of the above teachings. It is, therefore, to be understood that within the specification, the reference numerals are merely for convenience, and are not to be in any way limiting, as the invention may be practiced otherwise than what is specifically described.

The invention claimed is:

1. A method of forming a three dimensional object, comprising the steps of:
providing a nozzle of a cold spray gun for delivering a stream of powdered material to a substrate with said powdered material having a temperature below the melting point of the powdered material;
providing a light source for projecting at least one focused light strip;
aligning the cold spray gun at an angle $\theta_1$ to the substrate;
delivering the powdered material at a supersonic speed to the substrate thereby causing the powdered material to adhere to the substrate for forming a first layer of material upon the substrate;
projecting the at least one focused light strip onto the first layer at the substrate for defining its profile geometry;
generating a camera image of the at least one focused light strip projected onto the first layer of deposited material to determine the amount of change of the profile geometry caused by the first layer of deposited material adhered to the substrate by analyzing contours of the at least one focused light strip projected onto the first layer of deposited material, wherein analyzing contours of the focused light strips projected onto the first layer of deposited material comprises comparing a profile of the focused light strip captured in the camera image to a straight line, thereby determining a distortion of the focused light strip;

extracting real parameters of a surface of the first layer of deposited material from the determined distortion using geometric expressions, the extracting real parameters including establishing an angle of the first layer of material relative to the substrate from the optical distortion of the profile geometry determined by the camera image of the contours of the at least one focused light strip;

reorienting the cold spray gun based upon the profile geometry as determined by the camera image of the contours of the at least one focused light strip to an angle $\theta_2$ being offset from an axis defined by the first layer of material for optimizing delivery of the powdered material over the first layer of material; and delivering a second layer of material onto the first layer of material with the nozzle of the cold spray gun oriented at the angle $\theta_2$.

2. The method set forth in claim 1, wherein the step of reorienting the cold spray gun to an angle $\theta_2$ being offset from the axis defined by the first layer of material is further defined by the angle $\theta_2$ being offset from an axis being perpendicular to the first layer of material.

3. The method set forth in claim 1, further including the step of calculating the angle $\theta_2$, by the formula $$\theta_2 = \frac{-B \pm \sqrt{B^2 - 4(C - \alpha_2)A}}{2A}.$$

4. The method set forth in claim 3, further including the step of reorienting the cold spray gun to an angle $\theta_3$ being offset from an axis defined by the second layer of material is further defined by the angle $\theta_3$ being offset from the axis defined by the second layer of material being perpendicular to the second layer of material.

5. The method set forth in claim 4, further including the step of calculating the angle $\theta_3$ by the formula $$\theta_3 = \frac{-B \pm \sqrt{B^2 - 4(C - \alpha_3)A}}{2A}.$$

6. The method set forth in claim 5, wherein the step of delivering powdered material to at a supersonic speed is further defined by orienting the nozzle of the cold spray gun at a perpendicular angle $\theta$, to the substrate.

7. The method set forth in claim 1, wherein the step of projecting the at least one focused light strip onto the first layer comprises projecting four focused light strips onto the first layer of powdered material deposited onto the substrate, and determining a contour in at least one focused light strip of the four focused light strips thereby identifying a configuration of the first layer of powdered material.

8. The method set forth in claim 7, wherein the step of projecting the at least one focused light strip onto the first layer comprises projecting onto the second layer of powdered material deposited onto the substrate, and determining a contour in at least one focused light strip of the four focused light strips thereby identifying a configuration of the second layer of powdered material.

9. The method set forth in claim 8, wherein the step of delivering a second layer of material onto the first layer of material with the nozzle of the cold spray gun is further defined by articulating the cold spray gun based upon the distortion of the at least one focused light strip of the four focused light strips in the camera image projected onto the first layer of material.

10. The method set forth in claim 1, further including the step of turning the substrate relative to the nozzle of the spray gun thereby modifying formation of the powder material deposited at the substrate.

11. The method forth in claim 1, further including the step of moving the substrate in horizontal and vertical direction relative to the nozzle of the spray pin thereby modifying formation of the layer of powder material deposited at the substrate.

12. The method set forth in claim 1, further including the step of machining at least one of the first layer or the second layer of powdered material thereby modifying the configuration of the powdered material deposited at the substrate.

13. The method set forth in claim 1, further including the step of modifying powder deposition parameters of the spray gun in response to optical distortion of the contour of the at least one focused light strip projected onto each layer of deposited powder material.

14. The method set forth in claim 1, wherein the camera image is generated using at least one infrared digital camera.

15. The method of claim 1, wherein the at least one focused light strip includes four focused light strips, and the four focused light strips are projected such that the focused light strips surround the stream of powder at the substrate.

16. The method of claim 1, wherein the real parameters of the first layer of deposited material are parameters of a surface contour of the first layer of deposited material.

* * * * *

UNITED STATES PATENT AND TRADEMARK OFFICE
CERTIFICATE OF CORRECTION

PATENT NO. : 11,529,681 B2
APPLICATION NO. : 15/676115
DATED : December 20, 2022
INVENTOR(S) : Maev et al.

It is certified that error appears in the above-identified patent and that said Letters Patent is hereby corrected as shown below:

In the Claims

Column 8, Line 32, In Claim 11, replace "spray pin" with --spray gun--

Signed and Sealed this
Seventh Day of March, 2023

Katherine Kelly Vidal
*Director of the United States Patent and Trademark Office*